Patented Apr. 22, 1924.

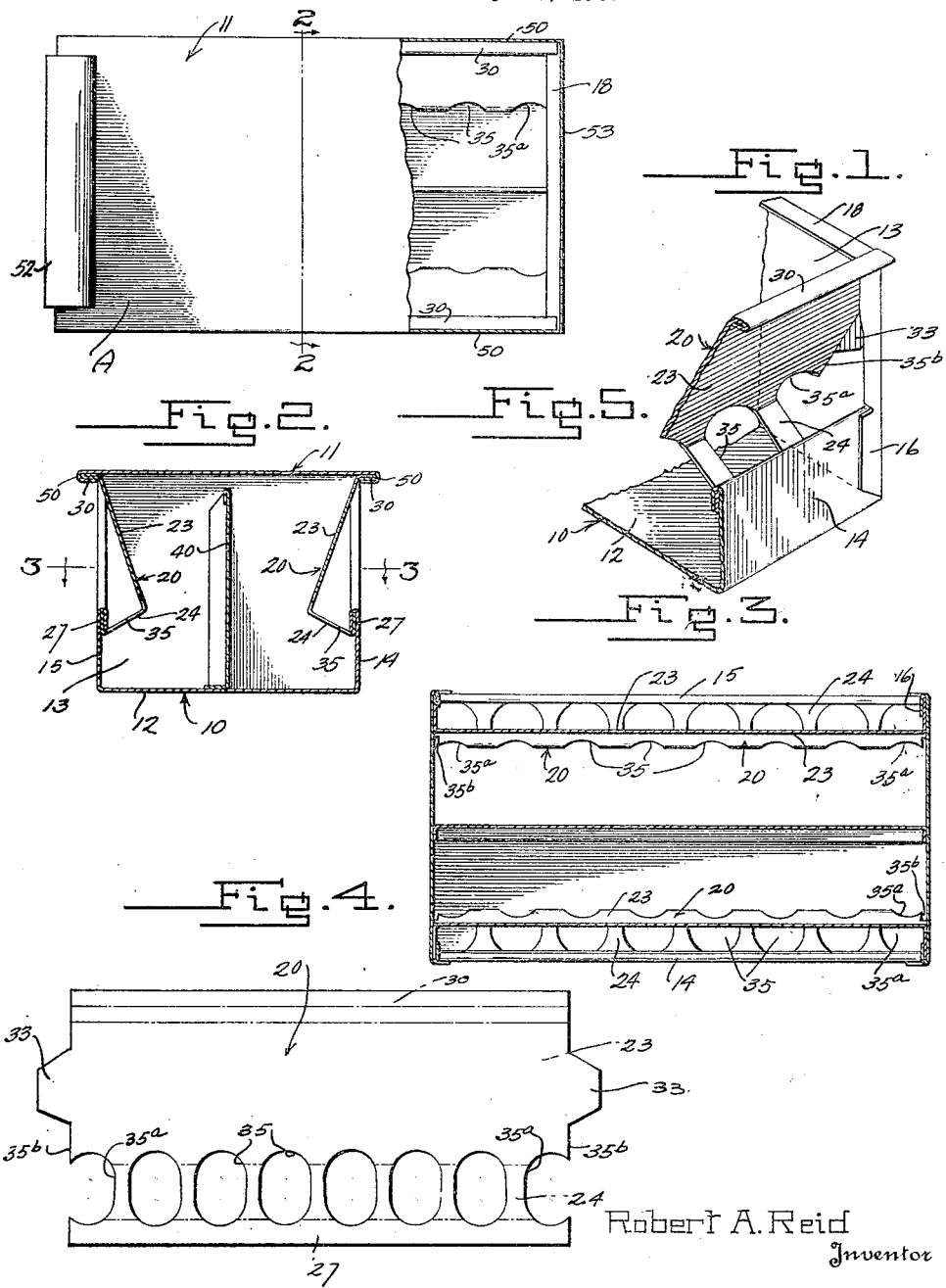

1,491,630

UNITED STATES PATENT OFFICE.

ROBERT A. REID, OF PARKERSBURG, IOWA, ASSIGNOR TO HELENE K. REID, OF PARKERSBURG, IOWA.

FEEDER.

Application filed May 21, 1923. Serial No. 640,453.

*To all whom it may concern:*

Be it known that I, ROBERT A. REID, a citizen of the United States, residing at Parkersburg, in the county of Butler and State of Iowa, have invented certain new and useful Improvements in Feeders, of which the following is a specification.

This invention relates to improvements in feeders such as are generally used for stock and poultry.

The primary object of this invention is the provision of a feeder which may be generally used for feeding purposes, but which is particularly desirable for use as a mash and grain feeder for poultry, and which embodies means to insure the continuous feeding of the mash or grain so that the poultry may have access thereto.

A further object of this invention is the provision of a novel type of feeder which embodies hopper means for retaining a supply of food, the feeder being so provided with feed openings that the poultry may have access to the feed in such manner as to insure forwarding of the food into proper feeding relation with the feed openings in the improved device.

Other objects and advantages of this invention will be apparent during the course of the following detailed description.

In the accompanying drawing, forming a part of this specification, and wherein similar reference characters designate corresponding parts throughout the several views:

Figure 1 is a plan view, partly in cross section, showing improved details of the feeder.

Figure 2 is a cross sectional view, taken substantially on the line 2—2 of Figure 1, through the improved feeder.

Figure 3 is a horizontal cross sectional view, taken substantially on the line 3—3 of Figure 2.

Figure 4 is a developed view of a wall construction as preferably embodied in the improved feeder.

Figure 5 is a fragmentary perspective view of a corner of the improved feeder showing novel cooperating details of the invention.

In the drawing, wherein for the purpose of illustration is shown but the preferred embodiment of this invention, the letter A may generally designate the improved feeder, which may embody a receptacle or body portion 10, and a closure arrangement or member 11 therefor.

Referring to the body portion 10, the same is preferably constructed of galvanized sheet metal, tin, aluminum, or any approved material, and preferably comprises a flat bottom 12, having the end walls 13 integrally formed therewith and bent upwardly therefrom in a plane at right angles thereto; and the relatively short side walls 14 and 15 disposed in vertical planes at right angles to the bottom 12. The end walls are preferably provided with side marginal flanges 16, which may be bent over the exterior surface of their adjacent side walls 14 and 15 for soldering or otherwise securing thereto to provide a rigid structure. The end walls 13, at the tops thereof, are preferably provided with inwardly extending flanges 18 for cooperation with the closure 11 to provide a leak proof connection.

The body portion 10 of the improved feeder preferably comprises sheet metal members 20, one of which is provided as a part of each side wall construction of the body portion for cooperation with the relatively short side walls 14 and 15 above mentioned. Each of these portions 20 preferably includes a hopper wall portion 23, and a ledge portion 24; said portions preferably being formed in planes at less than 180° with respect to each other and preferably at right angles. At its free edge each ledge portion 24 is preferably upwardly flanged, as at 27, which is adapted for attachment to the upper portion of a side wall 14 and 15, as by having said side wall crimped or flanged in U-shaped manner, substantially as is illustrated in Figure 2 of the drawing to provide an inside pocket for the reception of this upwardly extending ledge flange 27. When in this position the portion 20 extends inwardly of the compartment provided by the body portion, with the ledge portion 24 thereof extending inwardly and upwardly from the side wall portion 14 or 15 to which it is attached. The hopper wall portion 23, of course, inclines from the inner edge of the ledge portion 24 upwardly and outwardly of the compartment provided by the body portion 10, and at its upper end is preferably provided with a guide flange 30 horizontally positioned and doubled upon itself, as will be noted from Figure 2 of the drawing. These guide flanges extend beyond the plane defined by the side walls 14 and 15, and are provided for slidably receiving the closure member 11, as will be subsequently mentioned.

The hopper wall portions 23 of the members 20 are preferably provided with retaining wings 33 at the sides thereof, which are adapted to be bent as to overlie in abutting relation the inside surface of the feeder end walls 13 for attachment thereto, as by soldering or welding. The ledge portion 24 of each of the members 20 is preferably provided with a plurality of feed openings 35 therein of any approved number, which at their ends extend upwardly for a short distance into the hopper portion 23, substantially as is illustrated in Figures 1, 2, 3, and 4, and at their other or opposite ends, these feed openings 35 may extend into the attaching flange 27 but which is not so important. At each end of each of the members 20, feed apertures 35$^a$ are provided, which are open upon the side marginal edges 35$^b$ of each member 20; these feed openings 35$^a$ being formed analogous to the openings 35, and likewise extending upwardly for short distances into the hopper wall portions 23.

The members 20 attached as above mentioned to the side walls 14 and 15 and the end walls 13 have their hopper portions 23 extending in converging relation from the open top of the body portion 10. Within the compartment of the body portion 10, and preferably midway between the side walls thereof, the partition wall 40 is preferably provided, having the ends and the bottom thereof provided with attaching flanges for overlying the end walls and bottom of the body portion and to be secured thereto as by welding or soldering. This partition wall 40 is positioned in a vertical plane and cooperates with the hopper wall portions 23 in suspending a quantity of food as can readily be understood.

Referring to the members 20 as secured to the end walls 13 and the side walls 14 and 15 of the body portion 20, it is to be noted that the end feed openings 35$^a$ open directly upon the end walls of the feeder, and the attaching ears or wings are so secured to the end walls that the marginal edges 35$^b$ of the members 20 are spaced from said end walls so that feed above the hopper portions 23 may fall intermediate the marginal edges 35$^b$ and their adjacent end walls 13.

It has been the experience with feeders embodying inclined hopper walls, that as the food reaches the lower margin of the hopper walls, it is there supported or suspended in a mass, so that no more food can fall into the lower compartment of the feeder for access by poultry or stock, and thus defeating the purpose of the feeder. This is not an exceptional occurrence with feeders, but is generally the fault with the types of feeders having inclined hopper walls and using mash and grain as food. To obviate this difficulty, the improved feeder has been provided with intermediate feed openings 35, which extend upwardly into the hopper wall portion, whereby the stock or poultry may have access to that mass of the food which is upwardly of the lower margin of the hopper wall, and whereby the mass incident to being consumed by the poultry or stock will be caused to drop in accordance with the function which the feeder of the class described should perform. Another and very important feature is that of providing the end feed openings 35$^a$ of the feeder so that the lower corners of the hopper walls adjacent the end walls, are spaced therefrom to prevent the packing of the grain or food in a mass upwardly of the upper walls at the corners thereof. From this it can be seen that the food in a mass will be prevented from forming or packing back of the hopper walls, so that the poultry may have access thereto, and will obviate a great difficulty found in feeders in that the mash will be prevented from forming at the ends of the hopper walls so that the poultry may not have access thereto.

Referring to the closure 11, the same is preferably formed of a single piece of sheet material, having the side flanges 50 thereon bent beneath the same to slidably receive the outwardly extending horizontal guide flanges 30 of the body portion 10 therein. At its forward end a finger engaging roll 52 may be bent upwardly upon the closure 11, and at the opposite end, a depending stop flange 53 may be provided for abutment against the exterior surface of an end wall 13, to determine the closed position of the member 11 upon the body portion 10.

From the foregoing description of this invention, it is obvious that a feeder has been provided, which possesses practical merit, in that the same will facilitate the correct function of the food therein, obviating difficulty which has been experienced with practically all feeders of the type described which do not embody the novel features of the feed openings and hopper walls herein defined.

Various changes in the shape, size and arrangement of parts may be made to the form of the invention herein shown and described, without departing from the spirit of the invention or the scope of the claims.

I claim:

1. A feeder comprising a receptacle which includes an inwardly extending ledge and a hopper wall, said ledge having a feeder aperture therein which extends into the hopper wall.

2. As an article of manufacture, a wall member for feeders including portions bent at less than 180° with respect to each other, one of said portions having a feed aperture therein which extends partially into the other portion.

3. As an article of manufacture, a wall member for feeders including portions bent substantially at right angles to each other, one of said portions providing a ledge with a series of intermediate apertures which extend partially into the other portion of said wall member, said portions having feed apertures open at the ends thereof.

4. As an article of manufacture, a hopper wall construction for feeders providing a hopper wall proper and a ledge bent substantially at right angles to the hopper wall proper, the free edge of the hopper wall proper being provided with a guide flange thereon and at its ends provided with attaching wings, said ledge having feed apertures therein which extend upwardly into the hopper wall proper both at the ends of said wall and intermediate the same.

5. As an article of manufacture, a feeder comprising a receptacle portion which includes a bottom, end walls, and side walls, and hopper wall constructions having feed openings which extend upwardly from the lower edges thereof.

6. As an article of manufacture, a feeder comprising a receptacle portion which includes a bottom, end walls, and an inclined hopper wall provided with intermediate feed openings extending upwardly from the lower edge thereof and end feed openings extending upwardly from the lower ends thereof and opening directly upon said end walls of the receptacle upwardly of the lower edge of said hopper wall.

7. As an article of manufacture, a feeder comprising a body portion including a bottom, end walls, relatively short side walls having their upper marginal edges terminating short of the tops of said end walls, ledges connected at the upper ends of the side walls extending inwardly and upwardly of the receptacle portion, hopper walls extending upwardly and outwardly from the inner ends of the ledges, a partition plate intermediate the hopper walls within said receptacle, said ledges and hopper walls having feed openings therein which extend upwardly in the hopper walls above the lower marginal edges thereof.

ROBERT A. REID.